United States Patent [19]

Suzuki et al.

[11] Patent Number: 5,459,551

[45] Date of Patent: Oct. 17, 1995

[54] LIGHT EMISSION DEVICE FOR FOCUS DETECTION HAVING A CHART AND AN ILLUMINATOR

[75] Inventors: Kenji Suzuki; Takeshi Koyama; Keiji Ohtaka; Yasuo Suda, all of Yokohama, Japan

[73] Assignee: Canon Kabushiki Kaisha, Tokyo, Japan

[21] Appl. No.: 188,109

[22] Filed: Jan. 28, 1994

Related U.S. Application Data

[63] Continuation of Ser. No. 926,374, Aug. 10, 1992, abandoned, which is a continuation of Ser. No. 686,865, Apr. 16, 1991, abandoned, which is a continuation of Ser. No. 390,886, Aug. 8, 1989, abandoned.

[30] Foreign Application Priority Data

Aug. 13, 1988 [JP] Japan .................................. 63-202449

[51] Int. Cl.[6] .................................................. G03B 13/36
[52] U.S. Cl. ........................................................ 354/403
[58] Field of Search .................................. 354/402, 403; 356/1, 4; 250/201.4

[56] References Cited

U.S. PATENT DOCUMENTS

| | | | |
|---|---|---|---|
| 4,255,029 | 3/1981 | Freudenschuss | 354/403 |
| 4,313,654 | 2/1982 | Matsui et al. | 354/403 |
| 4,575,211 | 3/1986 | Matsumura et al. | 354/403 |
| 4,690,538 | 9/1987 | Matsui et al. | 354/403 |
| 4,740,806 | 4/1988 | Takehana | 354/403 |
| 4,748,469 | 5/1988 | Tamura | 354/403 |
| 4,764,786 | 8/1988 | Tamura et al. | 354/403 |
| 4,768,052 | 8/1988 | Hamada et al. | 354/402 |
| 4,768,053 | 8/1988 | Matsuda et al. | 354/403 |
| 4,804,991 | 2/1989 | Ichizuki et al. | 354/403 |
| 4,843,415 | 6/1989 | Matsui et al. | 354/403 |

FOREIGN PATENT DOCUMENTS

| | | |
|---|---|---|
| 3709709A1 | 3/1987 | Germany . |
| 1235344 | 6/1971 | United Kingdom . |
| 1508365 | 4/1978 | United Kingdom . |
| 1541332 | 2/1979 | United Kingdom . |

*Primary Examiner*—W. B. Perkey
*Attorney, Agent, or Firm*—Fitzpatrick, Cella, Harper & Scinto

[57] ABSTRACT

A device for projecting, by a light projection lens, a pattern chart image toward an object focus-detected by a focus detecting device comprises a chart having a predetermined pattern, and an illuminator for illuminating the chart nonuniformly.

13 Claims, 4 Drawing Sheets

LIGHT EMISSION DEVICE FOR FOCUS DETECTION HAVING A CHART AND AN ILLUMINATOR

This application is a continuation of application Ser. No. 07/926,374 filed Aug. 10, 1992, which is a continuation of application Ser. No. 07/686,865 filed Apr. 16, 1991, which is a continuation of application Ser. No. 07/390,886 filed Aug. 8, 1989, all now abandoned.

BACKGROUND OF THE INVENTION

1. Field of the Invention

This invention relates to an auxiliary light emission device for focus detection suitable for providing a pattern-reflected image to a focus detecting device having a plurality of distance measuring points or a wide range of distance measuring field.

2. Related Background Art

Heretofore, it has been practised to project a pattern for the detection of the focus-adjusted state of an objective lens to an object of small contrast or an object of low luminance or for the detection of the object distance. Japanese Patent Publication No. 49-19810 and Japanese Laid-Open Patent application No. 55-111929 are known, and the assignee of the present invention proposed the technique of this kind in U.S. applications Ser. Nos. 941,308 and 039,021.

Further, a focus detecting device provided with a plurality of distance measuring fields, and a focus detecting device having a wide range of field and an auxiliary light emission device suitable therefor are proposed in Japanese Laid-Open Patent Applications Nos. 63-78133, 63-78134, 63-82403, 63-82407 and 63-91645. By using a device having a plurality of distance measuring fields, focusing of a phototaking lens on a main object lying at a desired position in the picture plane can be accomplished independently of the framing of a camera, and this leads to the advantage that the degree of freedom of the composition by an apparatus such as a still camera or a video camera is improved.

For example, in another application of the applicant's, a focus detecting device having three distance measuring points is constructed as shown in FIG. 5B of the accompanying drawings. FIG. 5A of the accompanying drawings depicts the whole of a single-lens reflex camera, and what is designated by A in FIG. 5A corresponds to the unit of FIG. 5B. The letter B denotes an auxiliary light emission unit. M1 designates a main mirror, M2 denotes a sub-mirror, P designates a pentaprism, E denotes an eyepiece, and F designates a film or a solid state image pickup element. The reference numeral 10 in the unit A denotes a field mask having rectangular openings 10a, 10b and 10c. These openings 10a, 10b and 10c determine parallel distance measuring fields, respectively. It is to be understood that the field mask 10 is disposed on or near the predetermined imaging plane of a zoom objective lens O in FIG. 5A.

The reference numeral 11 in FIG. 5B designates a two-aperture stop plate having openings 11a and 11b and having the function of dividing the exit pupil of the objective lens. The light fluxes of the same portion of an object passing through areas determined by these openings being reversely projected onto the exit pupil enter a photoelectric detector which will be described later.

The reference numeral 12 denotes a set of secondary imaging lenses which has positive lenses 12a and 12b. The set of secondary imaging lenses separates, for example, the portion of the object image restricted by the opening 10a vertically as viewed in FIG. 5B and re-images it. The object images formed by the secondary imaging lenses have the spacing therebetween changed in conformity with the focus-adjusted state of the objective lens. The two-aperture stop plate 11 and the set of secondary imaging lenses 12 are disposed in proximity to each other, but the design can also be made such that the marginal edge of the secondary imaging lenses serves also as a stop plate. It is desirable that a field lens be disposed near the field mask 10 and the two-aperture stop plate 11 be substantially imaged on the exit pupil of the objective lens. The reference numeral 13 designates a photoelectric detector provided with pairs of sensor arrays 13a and 13b, 13c and 13d, and 13e and 13f in the direction of arrangement of the secondary imaging lenses 12a and 12b. The direction of arrangement of the pairs of sensor arrays 13a and 13b, 13c and 13d, and 13e and 13f is orthogonal to the direction of division of the exit pupil of the objective lens. Instead of the sensor arrays being disposed so as to form pairs, the two ranges of one sensor array may be allotted. Each sensor array receives a light distribution based on the object image, and the photoelectric detector 13 outputs a signal conforming thereto.

The number of distance measuring fields with respect to the one set of secondary imaging lenses need not necessarily be three, but is determined by the imaging magnifications and the limits of the off-axis imaging performances of the imaging lenses 12a and 12b and how densely the sensor arrays can be disposed in a direction orthogonal to the direction of arrangement.

Besides what has been described above, a focus detecting device which functions equivalently to the device of FIG. 5B can also be constructed by juxtaposing a plurality of focus detecting optical systems each having one distance measuring field heretofore used, and such a technique is known.

On the other hand, an auxiliary light emission device for projecting a pattern onto a wide range of object surface, correspondingly to a focus detecting device having a plurality of distance measuring fields, has already been proposed. For example, the device of FIG. 6 of the accompanying drawings is such that a light emitted from a light emitting element 121 such as an LED illuminates a pattern chart 122 and the transmittance distribution shape of the pattern chart 122 is projected onto the object surface by a light projection lens 123. The LED element 121 has a convex spherical condensor lens 125 on the front face thereof and is adapted to efficiently direct the light from the light emitting chip 124 of the LED to the pattern chart. The pattern chart 122 has a stripe pattern extended in the lateral direction, i.e., covering all the distance measuring fields by a predetermined focal length, and can pattern-illuminate different object positions to which the plurality of distance measuring fields correspond, as shown in FIG. 7 of the accompanying drawings. In FIG. 7, A–D schematically show cases where the focal length of the photo-taking lens has been varied by zooming or the interchange of the lens, and in A, the focal length of the projection lens is long, and in D, the focal length of the projection lens is shortest. In each figure, the stripes in the lateral direction indicate the light quantity distribution pattern of the light projected by the light projection device, and the rectangles are object areas the fields of respective distance measuring points detect effectively. The shorter the focal length of the projection lens, the wider in angle is the picture plane and therefore, the object area each field detects becomes wider and the interval between the different distance measuring detection areas becomes greater. In FIG. 7, up to the state C are the limits in which the projected light pattern is effective for all of the three distance measuring points, and in the state D of the shorter focal length, only the middle distance measuring point is within the effective area of the projected light.

However, it has been found that the auxiliary light emission device of this type previously proposed suffers from the following problems. Firstly, to cope with the various focal length states of the photo-taking lens, it is necessary to project a pattern light onto as wide a range of the object field as possible, while on the other hand, the light energy projected onto a unit area is decreased and therefore, the effective reach distance of auxiliary light is decreased. The light power of a light source such as an LED which can be equipped in a portable camera apparatus is limited and therefore, this problem becomes more serious as the distance measuring field is enlarged to a wider range of the picture plane.

Secondly, with the usual photographic projection, it is often the case that the main object lies at the center of the picture plane, and when the frequency of use of each distance measuring point is taken into account, it is a great loss in use to project a light onto all the distance measuring points with an equal intensity of light. That is, it is desirable to distribute the light energy in accordance with the frequency of use of each distance measuring point.

SUMMARY OF THE INVENTION

The present invention provides a device which reduces the consumption of auxiliary light emission energy and does not reduce the focus detecting ability in ordinary photographing scenes.

An embodiment of the present invention which will be described later uses a plurality of illuminating optical systems to non-uniformly illuminate a chart on which a pattern is formed and therefore can project a light pattern onto a wide range of the object surface with an optimum energy distribution in conformity with the frequency of use of a distance measuring position. Also, the chart on which a pattern is formed is continuously used, whereby even if the intensity of the illuminating light is non-uniform, the pattern shape projected onto the object surface maintains its continuity, and even if the area on the object surface that each distance measuring field detects is varied by the interchange or zooming of a projection objective lens, stable detection can be accomplished.

An embodiment of the present invention which will be described later features a compact system for an auxiliary light emission device for projecting a light onto a wide field. At the same time, according to the present device, there is constructed a system which is reduced in the number of parts and is high in productivity and has a high degree of functionality.

DESCRIPTION OF THE PREFERRED EMBODIMENTS

Figure 1:
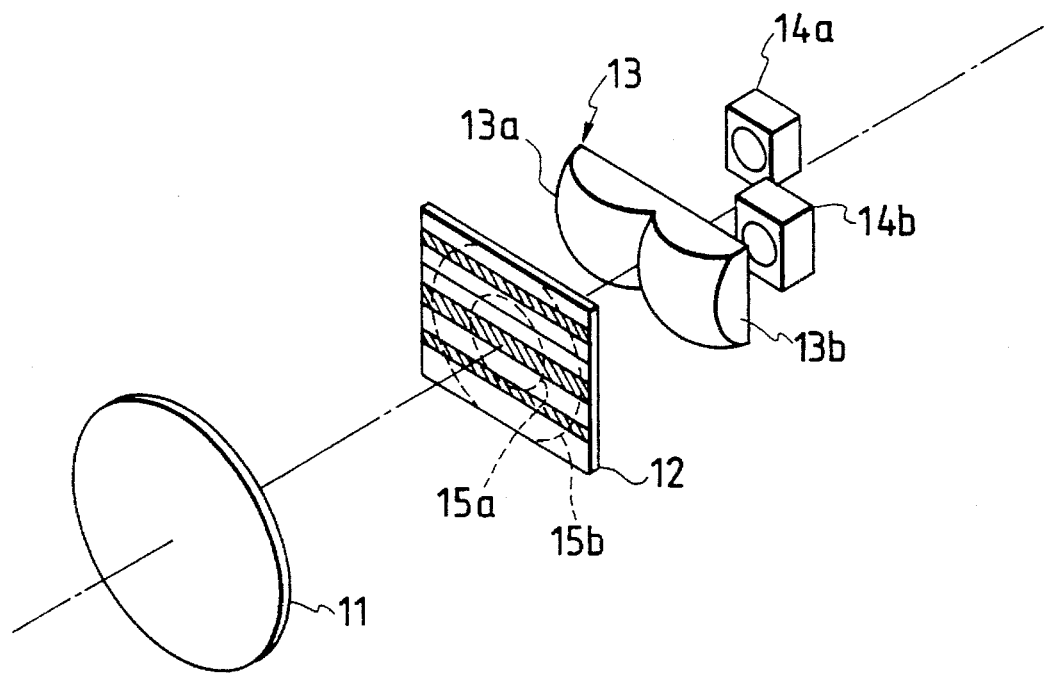
FIG. 1 is a perspective view of an auxiliary light emission device according to a first embodiment of the present invention.
Figure 5A:
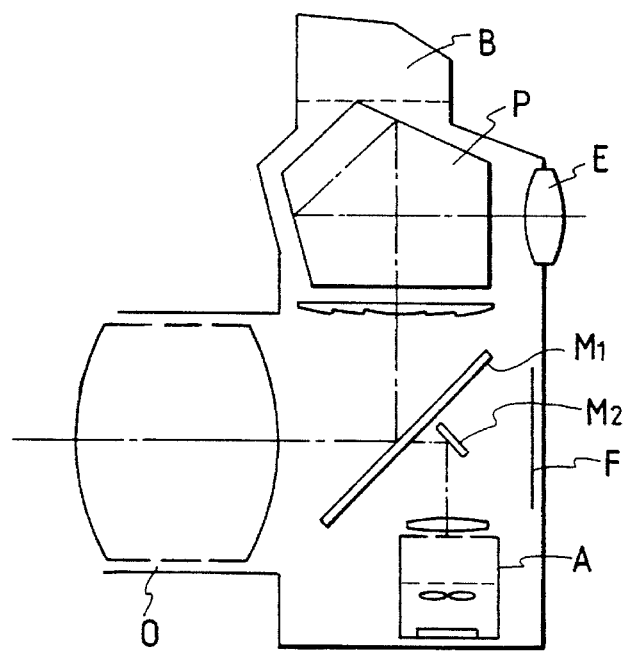
FIG. 5A is a cross-sectional view of a single-lens reflex camera.
Figure 5B:
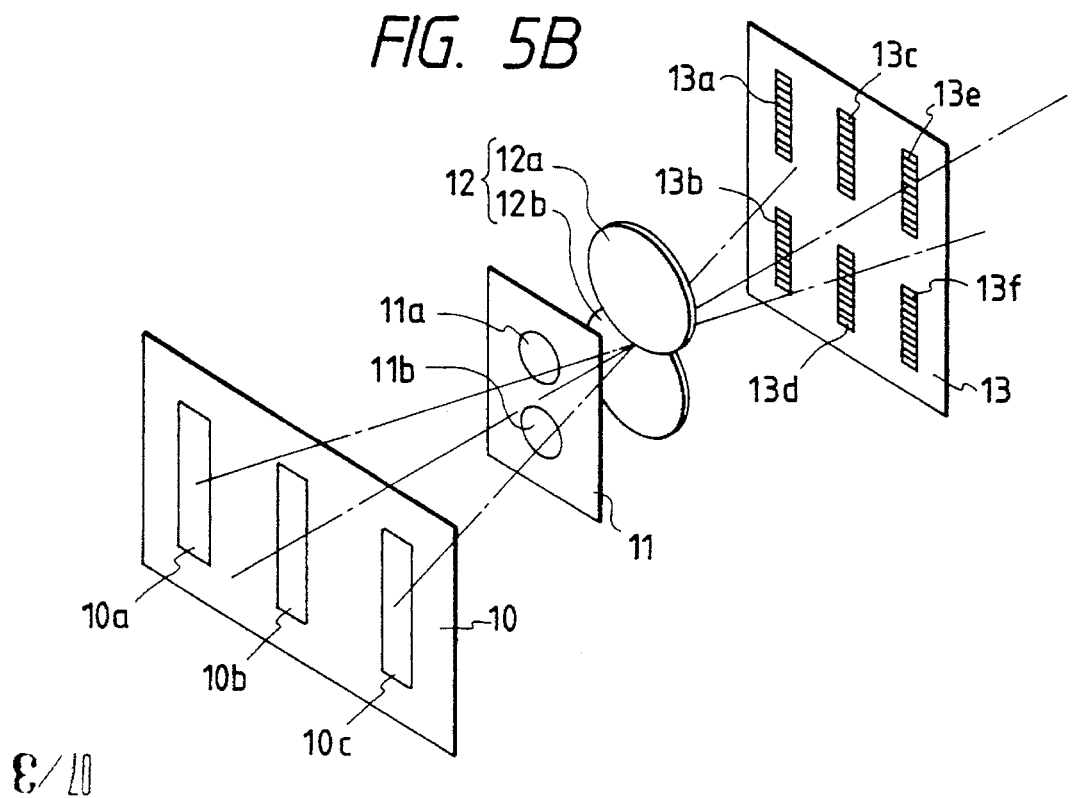
FIG. 5B is a perspective view showing an example of a focus detecting device for multipoint distance measurement used in combination with the auxiliary light emission device of the present invention.
Figure 7A:
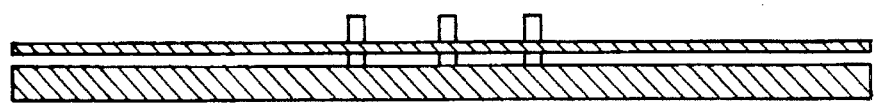
FIGS. 7A to 7D show operational states of the auxiliary light emission device.
Figure 7B:
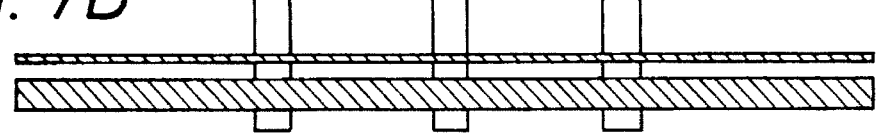
Figure 7C:
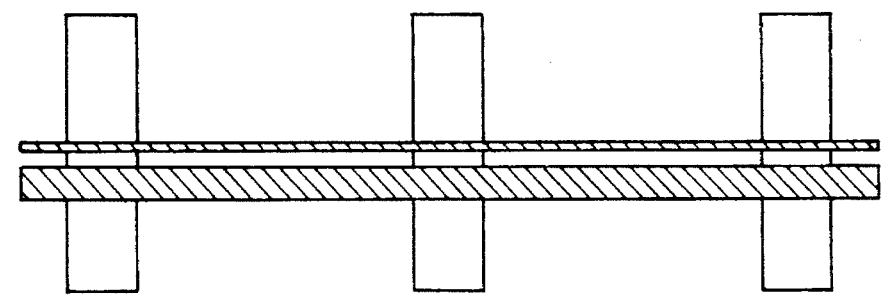
Figure 7D:
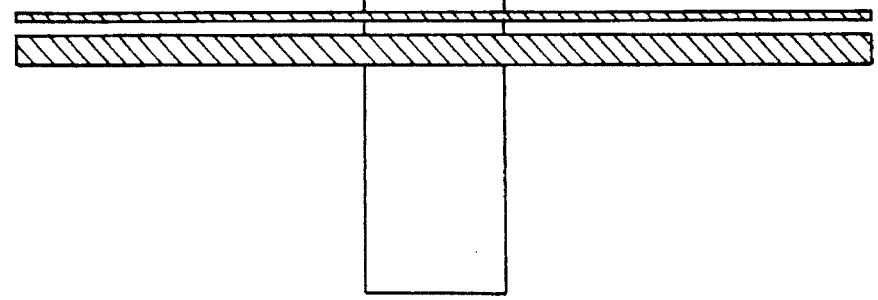

Some embodiments of the present invention will hereinafter be described with reference to the drawings. FIG. 1 shows an auxiliary light emission device according to a first embodiment of the present invention, and this device corresponds to the content of the unit B of FIG. 5A, and may be secured to or removably mounted on a camera body. In FIG. 1, a light projection lens 11 is disposed to form the real image of a pattern chart 12 on an object surface distant by several meters or more. The pattern chart is, for example, a monochromatic film having a long and continuous stripe pattern as shown applied thereto and developed into a density pattern. The pattern chart is illuminated by substantially two different illuminating optical systems. A condenser lens 13 for illumination is comprised of two lenses 13a and 13b differing in focal length from each other, and the lens 13a substantially projects the emergent light of a near-infrared LED 14a onto the area 15a of the pattern chart, and the lens 13b substantially projects the emergent light of an LED 14b onto the area 15b of the pattern chart. That is, the illuminating optical path of the LED 14a and condenser lens 13a and the illuminating optical path of the LED 14b and condenser lens 13b are inclined in opposite directions to each other with respect to the optic axis of the light projection lens 11. The focal length of the lens 13a is longer than the focal length of the lens 13b and accordingly, the magnification of the lens 13a is smaller than the magnification of the lens 13b. Therefore, the illuminating optical system comprising the lens 13a and the LED 14a intensely illuminates only the central portion of the chart 12. On the other hand, the illuminating system comprising the lens 13b and the LED 14b widely illuminates up to the marginal portion of the chart 12, but the illuminating light intensity thereof is diffused and becomes weak. Because of the difference between the focal lengths of the lenses 13a and 13b, the locations of the light sources LED's deviate from each other in the direction of the optic-axis. Also, the aperture diameter and disposition of the light projection lens 11 and the arrangement of the illuminating optical systems are determined so that the light transmitted through the pattern chart illuminated from a somewhat oblique direction may enter the effective aperture of the light projection lens 11.

Figure 2:
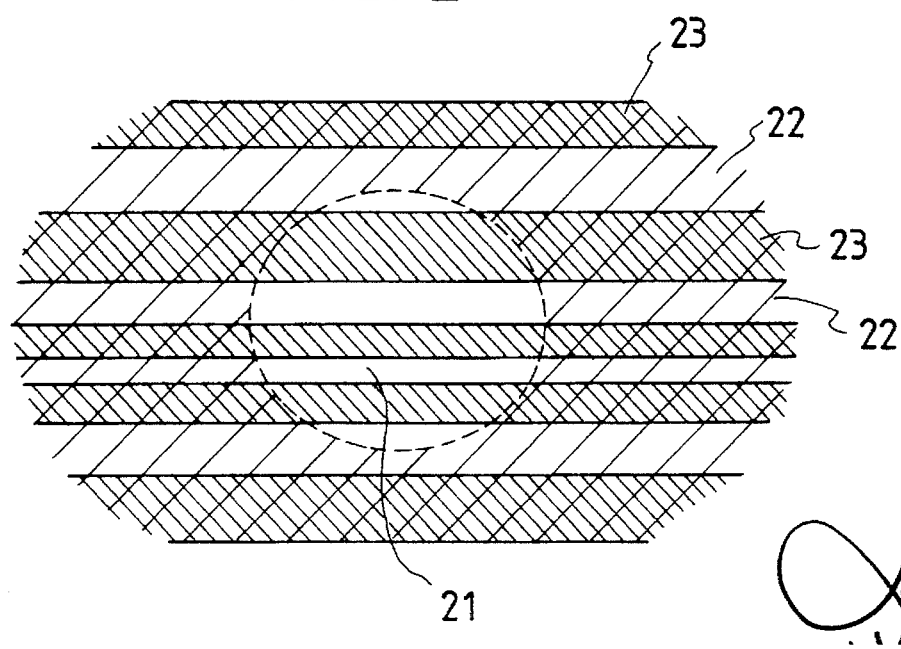
FIG. 2 is a plan view of the light projection pattern of the auxiliary light emission device according to the first embodiment of the present invention.

The auxiliary light emission device constructed in the manner described above projects onto the object surface a pattern represented by the product of the transmittance distribution and the illuminating light intensity distribution of the pattern chart 12. That is, there is obtained a pattern projection light as shown in FIG. 2 wherein a continuous stripe pattern is projected onto a wide range of the object surface and yet the light intensity of the central portion which is used with high frequency is remarkably emphasized. In FIG. 2, the area 21 is the central bright area, the zones 22, 22, . . . indicated by rough hatching are portions which are bright but not so bright as the central area 21, and the stripes 23, 23 . . . indicated by fine hatching are the dark portions of the pattern.

Figure 3:
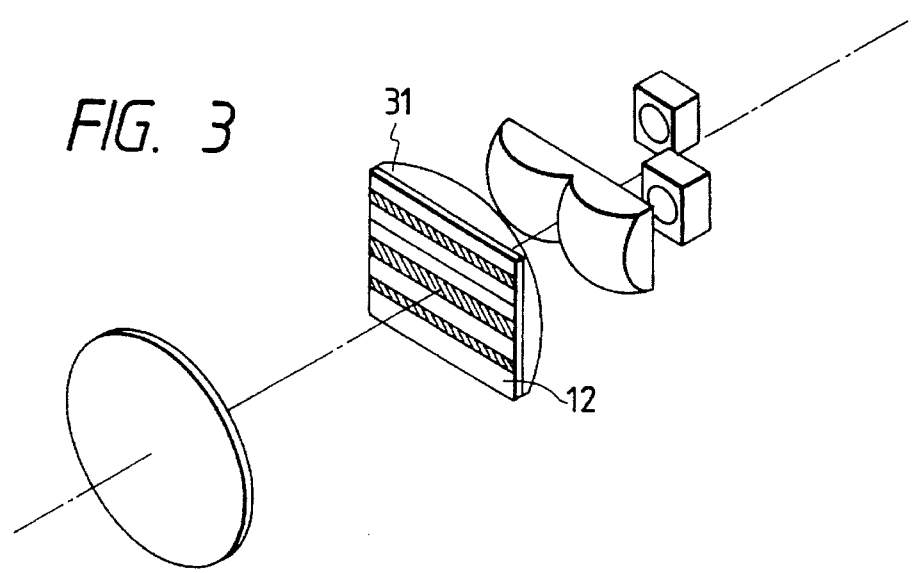
FIG. 3 is a perspective view of a modification of the first embodiment.

Incidentally, the device of the present embodiment can direct the illuminating light beam effectively to the aperture portion of the light projection lens if a field lens 31 is inserted near the pattern chart 12 as shown in FIG. 3, and this is more desirable.

Figure 4:
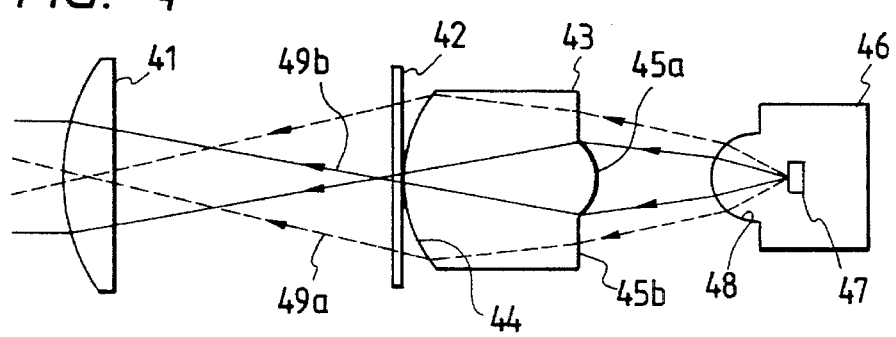
FIG. 4 is a plan view of an auxiliary light emission device according to a second embodiment of the present invention.
Figure 6:
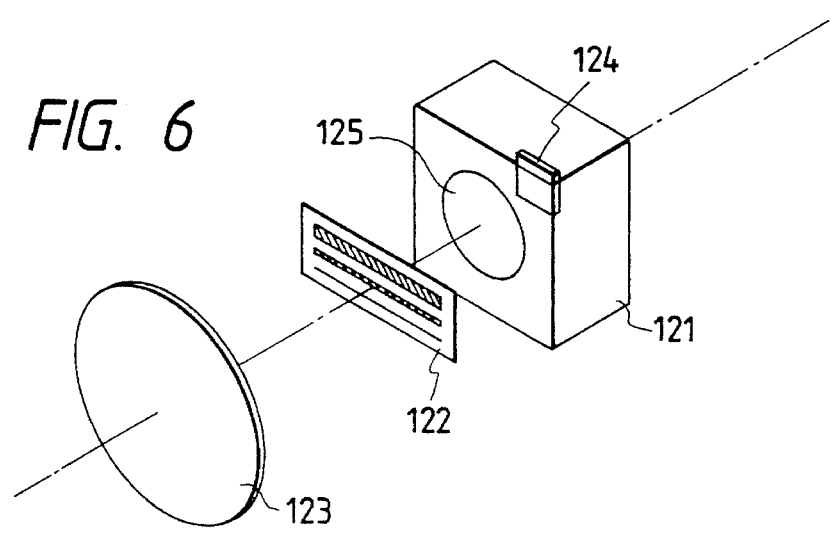
FIG. 6 is a perspective view showing an example of the auxiliary light emission device.

FIG. 4 shows another embodiment of the present invention. FIG. 4 is a plan view of an auxiliary light emission device, and the reference numeral 41 designates a light projection lens, the reference numeral 42 denotes a pattern chart, the reference numeral 43 designates an optical block member comprising two illuminating optical systems of the present invention made integral with each other, and the reference numeral 46 denotes an LED light source. The present embodiment is characterized in that as described above, two illuminating optical systems are made integral with each other and a common light source LED is used instead of two light source LED's.

The principle of the operation of the auxiliary light emission device according to the present embodiment will hereinafter be described.

A light emitted from an LED chip 47 enters the optical block member 43 via a front convex spherical surface 48. The convex spherical surface 48 has the effect of collecting the emitted light efficiently on the entrance surface of the member 43, and if there is further a parabola-shaped reflecting plate which encloses the LED chip on the back side thereof, the degree of utilization of light will desirably be improved.

The central portion of the entrance surface of the block member 43 forms a converging spherical surface 45a, and the light passed through a surface 44 corresponding to a field lens forms the real image of the LED chip 47 on the central portion of the pattern chart 42, that is, effects the so-called critical illumination. The effective aperture diameter and disposition of the light projection lens need to be chosen so that the critical illumination light beam 49b may be transmitted through the aperture portion of the light projection lens 41 without being eclipsed.

On the other hand, the light transmitted through the planar portion 45b around the entrance surface of the block member 43 is imaged by the power of the exit surface 44 to form the image of the LED chip on the pupil of the light projection lens, and forms a Köhler illumination light beam 49a.

In the auxiliary light emission device constructed as described above, the quantity-of-light distribution of the pattern chart 42 is projected intact onto the object surface and therefore, the critical-illuminated central portion forms a pattern brighter than the marginal portion, and there is obtained an auxiliary light pattern distribution as shown in FIG. 2. According to the present embodiment, there is provided a block member of complicated shape and an LED of relatively great output, but there can also be provided an auxiliary light emission deivce of high function having a small number of parts.

Assuming that besides the above-described embodiments, the white line portions of the pattern chart are constructed of an arrangement of LED's, the LED in the central area may be comprised of one having a great output.

As described above, according to the present invention, there is provided a highly efficient auxiliary light emmssion device in which a difference in the intensity of illumination light is imparted to the pattern chart, whereby more light energy is distributed on the central portion which is used with high frequency. According to the present invention, there is provided an auxiliary light emission device of compact and easy construction which, when used in combination with a focus detecting device having a number of distance measuring points, can illuminate a wide range of the object surface and has an effective auxiliary light effect up to a long distance with regard to the central portion of the picture plane which is used with high frequency.

What is claimed is:

1. An auxiliary light emission device for focus detection, comprising:

a light projection lens, a pattern chart;

an illuminating optical system for illuminating said pattern chart, the optical image of said pattern chart being projected onto an object surface to thereby assist a focus detecting device in the formation of the optical image; and at least first and second illuminating optical systems, said first illuminating optical system illuminating a first area of said pattern chart, said second illuminating optical system illuminating a second area of said pattern chart including said first area, the illuminating light intensity of said first area differing from that of the portion of said second area other than said first area;

wherein said first area of said pattern chart is surrounded by said second area, and the illuminating light intensity of said first area is greater than the illuminating light intensity of the portion of said second area other than said first area.

2. An auxiliary light emission device for focus detection, comprising:

a light projection lens, a pattern chart;

an illuminating optical system for illuminating said pattern chart, the optical image of said pattern chart being projected onto an object surface to thereby assist a focus detecting device in the formation of the optical image; and at least first and second illuminating optical systems, said first illuminating optical system illuminating a first area of said pattern chart, said second illuminating optical system illuminating a second area of said pattern chart including said first area, the illuminating light intensity of said first area differing from that of the portion of said second area other than said first area wherein said first and second illuminating optical systems have a common light source light emitting element.

3. Focusing detection apparatus comprising:

a projection means for projecting a light pattern onto a scene; and a light detection means for receiving the light pattern projected onto said scene and reflected therefrom; wherein said light detection means is operable to receive simultaneously and detect light reflected from spaced apart off-axis areas of the scene; and said projection means is operable to produce and project a light beam the intensity of which is a function of the light pattern and the brightness of which is lower at a periphery thereof, said projection means comprising:

a pattern chart;

illumination means for illuminating said pattern chart, said illumination means being operable to illuminate said chart non-uniformly so that it shall be illuminated less brightly at a periphery thereof, said illumination means comprising at least first and second illuminating optical means in which said first illuminating optical means is arranged to illuminate a first area of said pattern chart and said second illuminating optical means is arranged to illuminate a second area including and peripheral to said first area of said pattern chart, each illuminating optical means comprising a respective light source, said first and second illuminating optical means comprising respective first and second lenses of different focal lengths which are arranged at a common distance from said pattern chart and each of which is spaced from its respective light source by a different respective distance; and light projection means for projecting a real image of said pattern chart onto the scene; whereby:

for one condition of said light detection means when said off-axis areas of the scene are angularly spaced apart by a relatively narrow angle, said projection means is operable to illuminate said off-axis areas with light from a brighter part of said beam; and for another condition of said light detection means when said off-axis areas of the scene are angularly spaced apart by a relatively wide angle, said projection means is operable to illuminate said off-axis areas with light from the lower brightness periphery of said beam.

4. Apparatus as claimed in claim 3 wherein said light detection means comprises interchangeable lenses of longer and shorter focal length and is configurable in said one condition and in said another condition by an interchange of said lenses.

5. Apparatus as claimed in claim 3 wherein said projection means includes a field lens inserted adjacent to said pattern chart.

6. Apparatus as claimed in claim 3 wherein said first and second illuminating optical means comprise a common light source.

7. Apparatus as claimed in claim 1 wherein said first and second illuminating optical means comprise a common optical block.

8. A projector for projecting a pattern onto an object such that a focal point detecting means receives a reflection from said object, comprising:

means provided with a pattern formed by a plurality of lines having different widths;

illuminating means for unevenly illuminating said pattern, said illuminating means including (i) light source means, and (ii) first and second converging components having different focal lengths, said first and second converging components converging light emitted from said light source means on said pattern; and projecting optical means for projecting said pattern onto the object to be illuminated.

9. A projector according to claim 8, wherein said light source means includes a first light source for supplying light to said first converging component and a second light source for supplying light to said second converging component.

10. A projector according to claim 8, wherein said first converging component and said second converging component each include a lens.

11. A projector for projecting a pattern onto an object such that a focal point detecting means receives a reflection from said object, comprising:

means provided with a pattern formed by a plurality of lines having different widths;

a light source including (i) a light emitting portion, and (ii) a lens for converging light from said light emitting portion to supply an illuminating light; and optical means for directing said illuminating light onto said pattern, said optical means having a first portion for converging said illuminating light and a second portion for passing said illuminating light therethrough.

12. A projector according to claim 11, wherein said optical means includes a surface having characteristics of a field lens disposed near said pattern.

13. A projector according to claim 11, wherein said light source includes a light emitting diode.

* * * * *

UNITED STATES PATENT AND TRADEMARK OFFICE
CERTIFICATE OF CORRECTION

PATENT NO. : 5,459,551
DATED : October 17, 1995
INVENTOR(S) : Kenji Suzuki, et al It is certified that error appears in the above-indentified patent and that said Letters Patent is hereby corrected as shown below:

<u>Column 5</u>

Line 56, "deivce" should read --device--; and
    Line 64, "emmission" should read --emission--.

<u>Column 6</u>

Line 25, "area;" should read --area,--; and
      Line 47, "area" should read --area,--.

<u>Column 7</u>

Line 30, "claim 3" should read --claim 3,--;
    Line 35, "claim 3" should read --claim 3,--; and
    Line 38, "claim 3" should read --claim 3,--;
    Line 41, "claim 1" should read --claim 6,--.

Signed and Sealed this

Twenty-seventh Day of February, 1996

Attest:

BRUCE LEHMAN

Attesting Officer    Commissioner of Patents and Trademarks